United States Patent [19]
Yamagishi

[11] Patent Number: 4,757,489
[45] Date of Patent: Jul. 12, 1988

[54] ROTATION CONTROL APPARATUS FOR CONTROLLING ROTATION FREQUENCY OF AN INFORMATION RECORDING DISC WHICH IS TO BE ROTATED AT A CONSTANT LINEAR VELOCITY

[75] Inventor: Tooru Yamagishi, Tokyo, Japan

[73] Assignee: Victor Company of Japan, Japan

[21] Appl. No.: 903,014

[22] Filed: Sep. 2, 1986

[30] Foreign Application Priority Data

Sep. 3, 1986 [JP] Japan .................. 60-194291

[51] Int. Cl.⁴ .............................................. G11B 19/24
[52] U.S. Cl. ...................................... 369/50; 369/240
[58] Field of Search ............... 358/322, 338, 342; 360/73; 369/50, 111, 267, 240

[56] References Cited

U.S. PATENT DOCUMENTS

| | | | |
|---|---|---|---|
| 4,190,860 | 2/1980 | Somer et al. | 360/73 |
| 4,228,326 | 10/1980 | Dakin et al. | 369/50 |
| 4,338,683 | 7/1982 | Furukawa et al. | 369/50 |
| 4,388,713 | 6/1983 | Tatsuguchi | 369/50 |
| 4,439,849 | 3/1984 | Nabeshima | 369/50 |
| 4,530,018 | 7/1985 | Hoshino et al. | 360/73 |
| 4,623,939 | 11/1986 | Machida et al. | 369/50 |
| 4,638,375 | 1/1987 | Motoyama | 358/338 |

Primary Examiner—Donald McElheny, Jr.

[57] ABSTRACT

A rotation control apparatus controls a rotation frequency of a disc which is to be rotated at a constant linear velocity. The rotation control apparatus comprises a circuit for obtaining a first signal having a first frequency proportional to a rotation frequency of the disc, a circuit for comparing the first signal with a second signal having a second frequency which successively increases, and a control device for obtaining a present rotation frequency of the disc from the second signal which is obtained at a time when the first and second frequencies become equal to each other. The control device supplies to a motor which rotates the disc a driving signal which is obtained from the present rotation frequency in a recording mode, so that the disc rotates at the constant linear velocity.

13 Claims, 4 Drawing Sheets

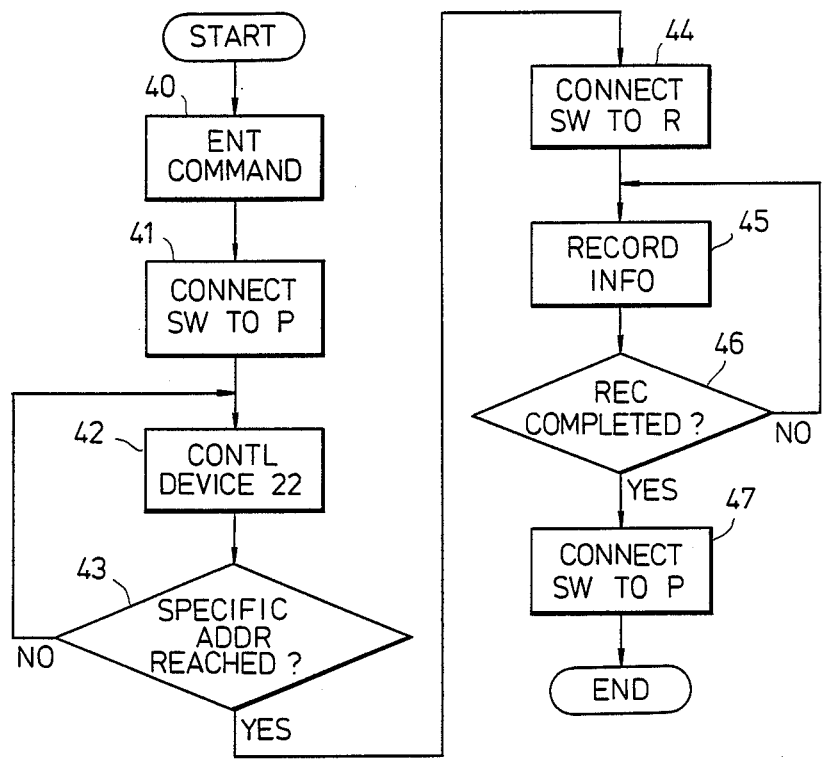
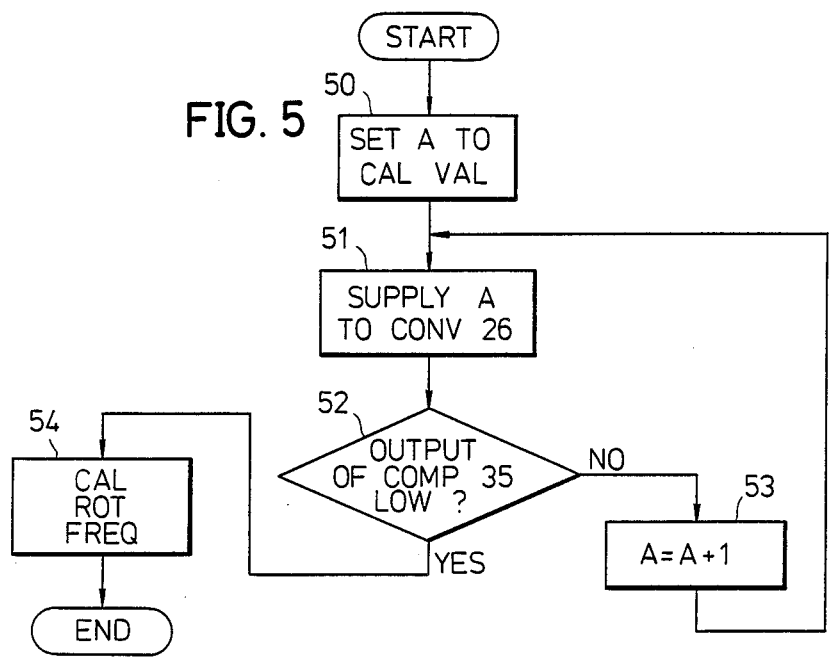

ROTATION CONTROL APPARATUS FOR CONTROLLING ROTATION FREQUENCY OF AN INFORMATION RECORDING DISC WHICH IS TO BE ROTATED AT A CONSTANT LINEAR VELOCITY

BACKGROUND OF THE INVENTION

The present invention generally relates to rotation control apparatuses for controlling rotation frequencies of information recording discs, and more particularly to a rotation control apparatus for controlling a rotation frequency of a constant linear velocity system information recording disc such as a digital audio disc so that the information recording disc is rotated at a constant linear velocity.

In a constant linear velocity system (hereinafter simply referred to as a CLV system), a rotational speed of an information recording disc (hereinafter simply referred to as a disc) is controlled so that a linear velocity thereof is constant regardless of a scanning radial position on the disc. In other words, the rotational speed of the disc is controlled to become faster at radial positions toward the inner peripheral part of the disc and the rotational speed of the disc is controlled to become slower at radial positions toward the outer peripheral part of the disc.

In a reproducing mode of the CLV system, a signal reproduced from the disc by a signal detecting element is formed into a motor driving signal in a motor driving signal generating circuit, and this motor driving signal is supplied to a spindle motor which rotates a turntable on which the disc is placed.

On the other hand, in a recording mode of the CLV system, a position detecting circuit detects a radial position of a driving device which drives the signal detecting element, and this detected radial position is converted into a digital position information in an analog-to-digital converter. The digital position information is converted into a rotation frequency information in a control device such as a microcomputer. In the CLV system disc, the radial position of the driving device is inversely proportional to the rotation frequency (angular velocity) of the disc, and it is hence possible to obtain the rotation frequency information from the radial position information. The rotation frequency information obtained in the control device is converted into a voltage proportional to the rotation frequency in a digital-to-analog converter and is supplied to the spindle motor.

However, when newly recording an information on the disc from a position where a previous recording has been discontinued, the linear velocity during the new recording and the linear velocity during the previous recording may not accurately coincide due to effects of temperature changes and the like on the driving device. Thus, when the new recording is carried out with a linear velocity different from that during the previous recording, it is impossible to obtain in the reproducing mode a smooth reproduced signal from a connecting part on the disc where the previous recording ends and the new recording starts, and there is a problem in that the reproduced signal is unnatural at the connecting part. In addition, since the conventional rotation control apparatus comprises no means for detecting the present rotation frequency of the disc, it is impossible to satisfactorily control the rotation frequency of the disc when the operation mode is changed from the reproducing mode to the recording mode, for example.

SUMMARY OF THE INVENTION

Accordingly, it is a general object of the present invention to provide a novel and useful rotation control apparatus for controlling the rotation frequency of the disc, in which the problems described heretofore are eliminated.

Another and more specific object of the present invention is to provide a rotation control apparatus for controlling a rotation frequency of a disc which is to be rotated at a constant linear velocity comprising a motor for rotating the disc, a signal detecting element for detecting a pre-recorded signal on the disc in a reproducing mode, a first signal generating circuit for generating a first signal from the signal detected by the signal detecting element, where the first signal has a first frequency proportional to a rotation frequency of the disc, a second signal generating circuit for generating from a predetermined signal a second signal having a second frequency which successively increases, a comparator circuit for comparing the first and second signals and for producing a signal indicating whether or not the first and second frequencies are equal to each other, and a control device supplied with the output signal of the comparator circuit for obtaining a present rotation frequency of the disc from the predetermined signal produced by the control device at a time when the first and second frequencies become equal to each other. The control device produces a driving signal from the present rotation frequency and supplies the driving signal to the motor in a recording mode, so that the disc rotates at the constant linear velocity. According to the rotation control apparatus of the present invention, it is possible to obtain the present rotation frequency of the disc.

Still another object of the present invention is to provide a rotation control apparatus for controlling a rotation frequency of a disc which is to be rotated at a constant linear velocity comprising a motor for rotating the disc, a signal detecting element for detecting a pre-recorded signal on the disc in a reproducing mode, a driving device for driving the signal detecting element, a position detecting circuit for detecting a scanning radial position of the signal detecting element on the disc and for producing a radial position information, a first signal generating circuit for generating a first signal and a first driving signal from the signal detected by the signal detecting element, where the first signal has a first frequency proportional to a rotation frequency of the disc, a second signal generating circuit for generating from a predetermined signal a second signal having a second frequency which successively increases, a comparator circuit for comparing the first and second signals and for producing a signal indicating whether or not the first and second frequencies are equal to each other, a control device supplied with the output signal of the comparator circuit and the radial position information from the position detecting circuit for obtaining a rotation frequency information of the disc from the predetermined signal produced by the control device at a time when the first and second frequencies become equal to each other and for obtaining a linear velocity information from the rotation frequency information and the radial position information, where the control device obtains a present rotation frequency from the linear velocity information and the radial position information and produces a second driving signal from the present rotation frequency, and a switch supplied with the first and second driving signals. The switch supplies the first driving signal to the motor in the reproducing mode and supplies the second driving signal to the motor in the recording mode, so that the disc rotates at the constant linear velocity. According to the rotation control apparatus of the present invention, when newly recording an information on the disc from a position where a previous recording has been discontinued, the linear velocity remains constant before and after the operation mode is changed from the reproducing mode to the recording mode. It is possible to obtain in the reproducing mode a smooth reproduced signal even from a connecting part on the disc where the previous recording ends and the new recording starts.

Other objects and further features of the present invention will be apparent from the following detailed description when read in conjunction with the accompanying drawings.

BRIEF DESCRIPTION OF THE DRAWINGS

FIG. 4 is a flow chart for explaining the operation of a microcomputer which constitutes a control device in the rotation control apparatus shown in FIG. 3 when controlling the switching state of a switch in the rotation control apparatus;

FIG. 5 is a flow chart for explaining the operation of the microcomputer which constitutes the control device in the rotation control apparatus shown in FIG. 3 when obtaining a present rotation frequency.

DETAILED DESCRIPTION

Figure 1:
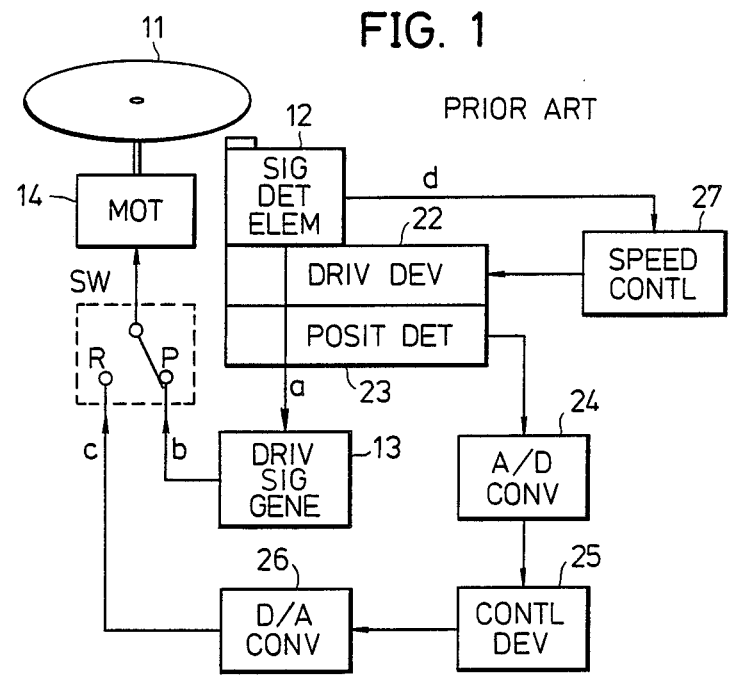
FIG. 1 is a system block diagram showing an example of the conventional rotation control apparatus for controlling the rotation frequency of the disc.

First, description will be given with respect to an example of the conventional rotation control apparatus for controlling the rotation frequency of the disc by referring to FIG. 1. In FIG. 1, a switch SW is connected to a terminal P in a reproducing (play) mode. A signal a reproduced from a CLV system disc 11 by a signal detecting element 12 is converted into a motor driving signal b in a motor driving signal generating circuit 13, and this motor driving signal b is supplied to a spindle motor 14 which rotates a turntable (not shown) on which the disc 11 is placed.

Figure 2:
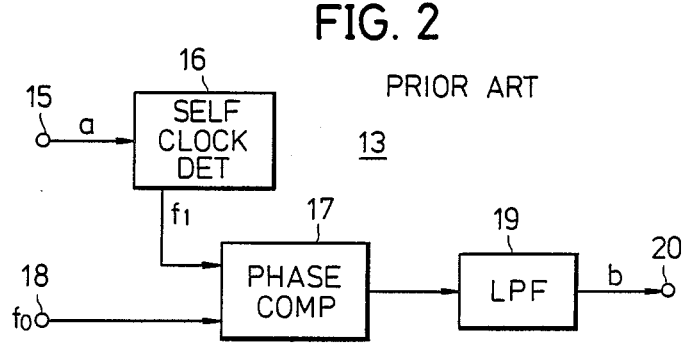
FIG. 2 is a system block diagram showing an example of a motor driving signal generating circuit in the block system shown in FIG. 1.

FIG. 2 shows an example of the construction of the motor driving signal generating circuit 13. The reproduced signal a from the signal detecting element 12 is supplied to a self clock detecting circuit 16 via a terminal 15. The self clock detecting circuit 16 detects the period of the reproduced signal a and produces a signal having a frequency f1 proportional to the rotation frequency (angular velocity) of the disc 11. This signal having the frequency f1 (hereinafter simply referred to as the signal f1) is supplied to a phase comparator 17.

The phase comparator 17 compares the phase of the signal f1 and the phase of a reference signal which is obtained from a terminal 18 and has a reference frequency f0. An output phase error signal of the phase comparator 17 dependent on a phase error between the signal f1 and the reference signal f0 is passed through a lowpass filter 19 and is obtained as the motor driving signal b from a terminal 20.

On the other hand, the switch SW is connected to a terminal R in a recording mode. In this case, a radial position of a driving device (feed motor) 22 which drives the signal detecting element 12 is detected by a position detecting circuit 23. An output position detection signal of the position detecting circuit 23 is supplied to an analog-to-digital (A/D) converter 24 and is converted into a digital position information. This digital position information from the A/D converter 24 is supplied to a control device 25 and is converted into a rotation frequency information. For example, the control device 25 is constituted by a microcomputer. In the CLV system disc 11, the radial position of the driving device 22, that is, the radial position on the disc 11, is inversely proportional to the rotation frequency of the disc 11, and it is hence possible to obtain the rotation frequency information from the radial position information. The rotation frequency information obtained in the control device 25 is converted into a voltage (motor driving signal) c proportional to the rotation frequency in a digital-to-analog (D/A) converter 26 and is supplied to the spindle motor 14.

During the recording and reproducing modes, a tracking error signal d obtained from the signal detecting element 12 is supplied to a speed control circuit 27 which supplies to the driving device 22 a feed motor driving signal dependent on the tracking error.

However, when newly recording an information on the disc 11 from a position where a previous recording has been discontinued, the linear velocity during the new recording and the linear velocity during the previous recording may not accurately coincide due to effects of temperature changes and the like on the driving device 22. Thus, when the new recording is carried out with a linear velocity different from that during the previous recording, it is impossible to obtain a smooth reproduced signal from a connecting part on the disc 11 where the previous recording ends and the new recording starts, and there is a problem in that the reproduced signal is unnatural at the connecting part. In addition, since the conventional rotation control apparatus comprises no means for detecting the present rotation frequency of the disc, it is impossible to satisfactorily control the rotation frequency of the disc when the operation mode is changed from the reproducing mode to the recording mode, for example.

Accordingly, the rotation control apparatus of the present invention is designed so that a smooth reproduced signal can be obtained even from the connecting part on the disc 11 where the previous recording ends and the new recording starts.

Figure 3:
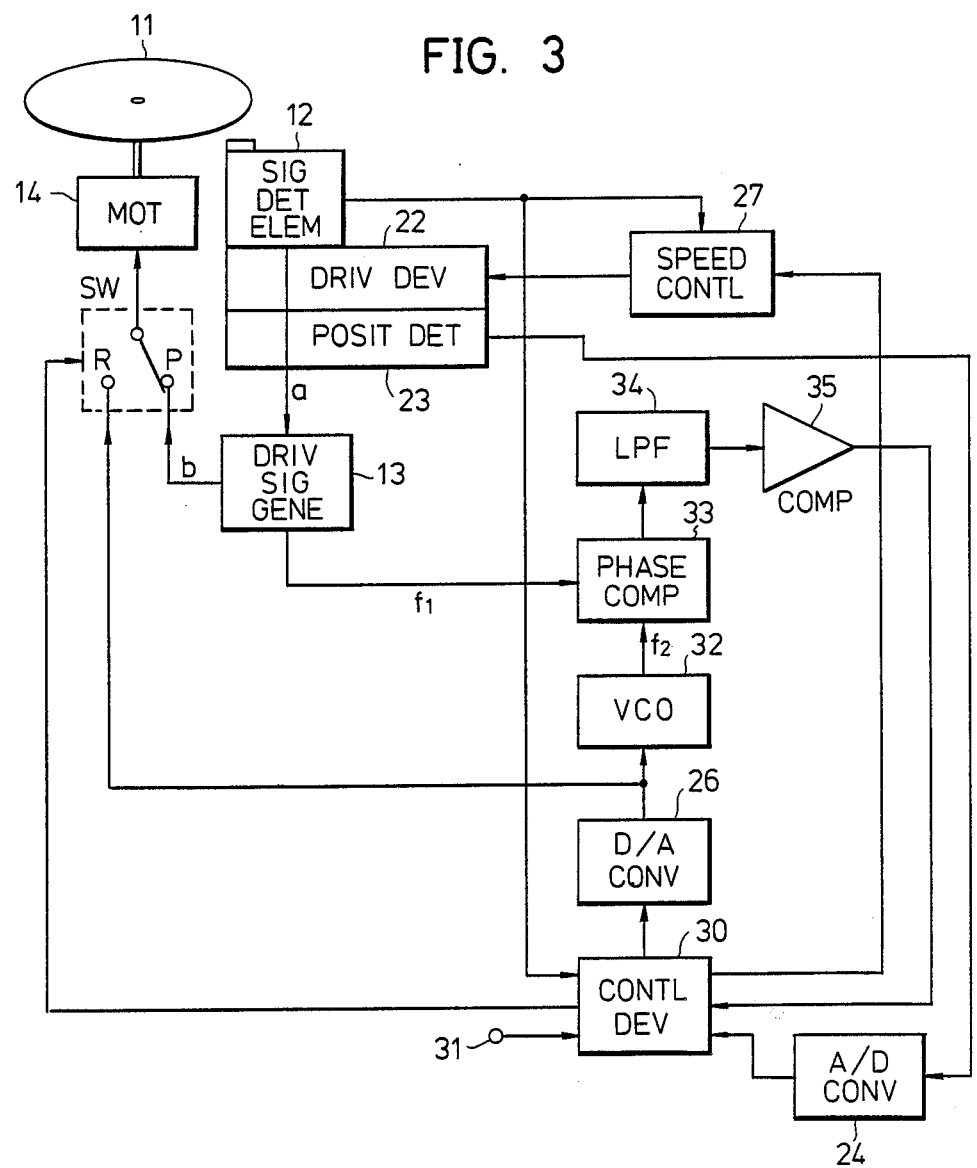
FIG. 3 is a system block diagram showing an embodiment of the rotation control apparatus for controlling the rotation frequency of the disc according to the present invention.

FIG. 3 shows an embodiment of the rotation control apparatus for controlling the rotation frequency of the disc according to the present invention. In FIG. 3, those parts which are the same as those corresponding parts in FIG. 1 are designated by the same reference numerals, and description thereof will be omitted.

During the reproducing mode, the switch SW is connected to the terminal P and the operation of the apparatus shown in FIG. 3 is similar to that of the conventional apparatus shown in FIG. 1 during the reproducing mode. In other words, the spindle motor 14 is controlled by the output motor driving signal b of the motor driving signal generating circuit 13.

During the recording mode, the switch SW is connected to the terminal R and the operation of the apparatus shown in FIG. 3 is similar to that of the conventional apparatus shown in FIG. 1 during the recording mode. In other words, the spindle motor 14 is controlled by the output motor driving signal of the D/A converter 26.

Next, description will be given for the case where an information is to be newly recorded on the disc 11 from a position where a previous recording has been discontinued. In FIG. 3, a control device 30 is constituted by a microcomputer, for example. When newly recording the information from a specific address on the disc 11 where the previous recording has been discontinued, a command signal is applied to a terminal 31 and is supplied to the microcomputer (control device 30). FIG. 4 is a flow chart for explaining the operation of the microcomputer for controlling the switching state of the switch SW. A step 40 shown in FIG. 4 enters the command signal into the microcomputer. A step 41 supplies a switching signal to the switch SW so as to connect the switch SW to the terminal P, and a step 42 controls the driving device 22 by a driving signal until the specific address is reached. The address is detected from an address signal within the signal which is reproduced by the signal detecting element 12 and is supplied to the control device 30. When a step 43 discriminates that the specific address has been reached, a step 44 supplies a switching signal to the switch SW so as to connect the switch SW to the terminal R. A step 45 newly records the information from the specific address by known recording means (not shown), and a step 46 discriminates whether or not the new recording is completed. A step 47 supplies a switching signal to the switch SW so as to connect the switch SW to the terminal P when the new recording is completed.

FIG. 5 is a flow chart for explaining the operation of the microcomputer (control device 30) for obtaining a present rotation frequency of the disc 11. A step 50 shown in FIG. 5 sets a variable A to a value in correspondence with a minimum rotation frequency of the disc 11 calculated from a present radial position on the disc 11. For example, a memory (not shown) of the microcomputer stores a regular rotation frequency of the disc 11 which is known beforehand for each radial position, and it is possible to calculate the minimum rotation frequency and thus the corresponding value for the variable A from the stored regular rotation frequency and the present radial position. On the other hand, the memory of the microcomputer may store a table containing calculated values of the variable A for each radial position, and in this case, it is sufficient to merely read the stored value from the table and the calculation to obtain the value for the variable A is unnecessary.

While the switch SW is connected to the terminal P and until the specific address is reached, the microcomputer supplies the variable A to the D/A converter 26 in a step 51. An output analog signal of the D/A converter 26 is supplied to a voltage controlled oscillator (VCO) 32 which is designed to produce a signal of higher frequency as the input signal thereof becomes larger. An output signal of the VCO 32 having a frequency f2 is supplied to a phase comparator 33 which compares the phase of the signal f2 and the phase of the signal f1 from the motor driving signal generating circuit 13. An output phase error signal of the phase comparator 33 is passed through a lowpass filter 34 and is supplied to a comparator 35 wherein the phase error signal is compared with a predetermined threshold value.

For example, the comparator 35 produces a low-level signal when the frequency f1 is lower than the frequency f2 and produces a high-level signal when the frequency f1 is higher than the frequency f2. The output signal of the comparator 35 is supplied to the control device 30. The microcomputer (control device 30) discriminates whether or not the output signal level of the comparator 35 is low in a step 52. When the discrimination result in the step 52 is NO, a step 53 increments the variable A by one, and the operation is returned to the step 51 and a control is carried out so that the frequency f2 becomes higher. When the discrimination result in the step 52 becomes YES, a step 54 calculates a rotation frequency in terms of the present variable A, and stores this rotation frequency by considering this rotation frequency to be the present rotation frequency of the disc 11. For example, the memory (not shown) of the microcomputer stores the regular rotation frequency of the disc 11 which is known beforehand for each value of the variable A, and it is possible to calculate the rotation frequency from the stored values and the present variable A. On the other hand, the memory of the microcomputer may store a table containing calculated values of the rotation frequency for each value of the variable A, and in this case, it is sufficient to merely read the stored value from the table and the calculation to obtain the rotation frequency is unnecessary.

Figure 6:
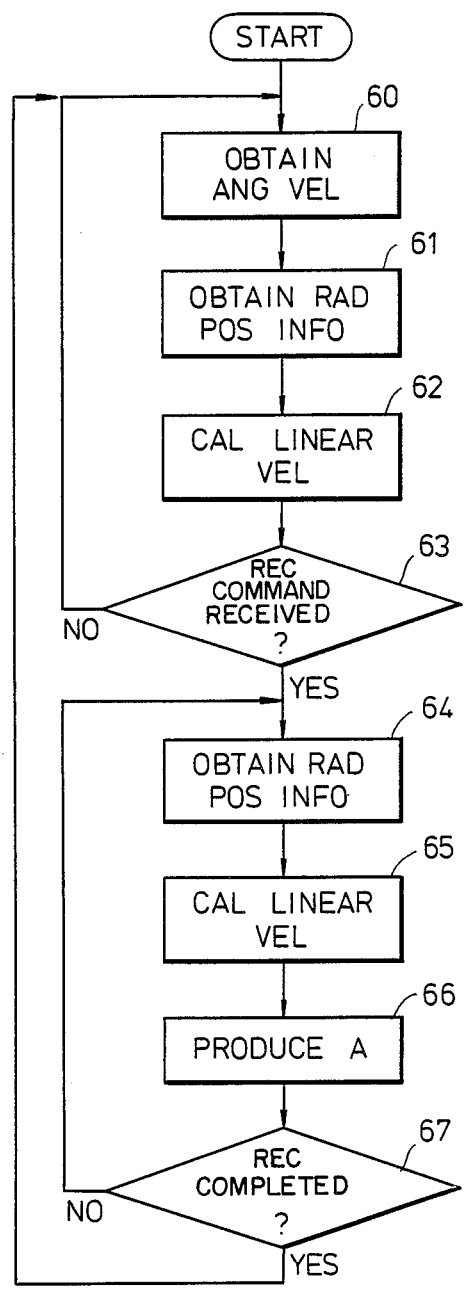
FIG. 6 is a flow chart for explaining the operation of the microcomputer which constitutes the control device in the rotation control apparatus shown in FIG. 3 when controlling the angular velocity of the disc.

FIG. 6 is a flow chart for explaining the operation of the microcomputer (control device 30) for controlling the angular velocity of the disc 11. A step 60 shown in FIG. 6 obtains a present angular velocity of the disc 11 from the present rotation frequency which is obtained by carrying out the operation shown in FIG. 5. A step 61 obtains from the output signal of the A/D converter 24 a radial position information related to the radial position on the disc 11. Then, a step 62 calculates a linear velocity from the following equation.

(Linear velocity) = (Radial position)×(Angulr velocity)

A step 63 discriminates whether or not a recording command is received, that is, whether or not the operation mode has been switched over to the recording mode. The operation is returned to the step 60 when the discrimination result in the step 63 is NO.

Next, when the discrimination result in the step 63 becomes YES, a step 109 obtains the radial position information from the output signal of the A/D converter 24. A step 65 calculates an angular velocity from the following equation.

(Angular velocity) = (Linear velocity)/(Radial position)

A step 66 produces a variable A in accordance with the calculated angular velocity. Accordingly, this variable A is supplied to the D/A converter 26 and the output signal of the D/A converter 26 is supplied to the spindle motor 14 so as to rotate the disc 11 at the calculated angular velocity. A step 67 discriminates whether or not the recording of the information has over completed, that is, whether or not the operation mode has been switched over to the reproducing mode. The operation is returned to the step 60 when the discrimination result in the step 67 is YES, and the operation is returned to the step 64 when the discrimination result in the step 67 is NO.

According to the present embodiment, it is possible to obtain the present rotation frequency of the CLV system disc. Especially in the case where a new recording is to be carried out from a position on the disc where the previous recording has been discontinued, it is possible to obtain the linear velocity by scanning the previous recording on the disc in the reproducing mode, and then, the operation mode is switched over to the recording mode and the disc is rotated at the rotation frequency which is obtained from the linear velocity and the radial position information. As a result, the linear velocity remains constant before and after the operation mode is switched from the recording mode to the reproducing mode. Therefore, it is possible to obtain in the reproducing mode a smooth reproduced signal from a connecting part on the disc where the previous recording ends and the new recording starts.

Further, the present invention is not limited to these embodiments, but various variations and modifications may be made without departing from the scope of the present invention.

What is claimed is:

1. A rotation control apparatus for controlling a rotation frequency of an information recording disc which is to be rotated at a constant linear velocity, said rotation control apparatus comprising:
a motor for rotating said information recording disc;
signal detecting means for detecting a pre-recorded signal on said information recording disc in a reproducing mode;
first signal generating means for generating a first signal from the signal detected by said signal detecting means, said first signal having a first frequency proportional to a rotation frequency of said information recording disc;
second signal generating means for generating from a predetermined signal a second signal having a second frequency which successively increases;
comparator means for comparing said first and second signals and for producing a signal indicating whether or not said first and second frequencies are equal to each other; and
control means supplied with the output signal of said comparator means for obtaining a present rotation frequency of said information recording disc from said predetermined signal produced by said control means at a time when said first and second frequencies become equal to each other,
said control means producing a driving signal from said present rotation frequency and supplying the driving signal to said motor in a recording mode, so that said information recording disc rotates at the constant linear velocity.

2. A rotation control apparatus as claimed in claim 1 in which said second signal generating means comprises a voltage controlled oscillator for generating said second signal responsive to said predetermined signal.

3. A rotation control apparatus as claimed in claim 2 in which an output oscillation frequency of said voltage controlled oscillator becomes higher as a value of said predetermined signal becomes larger.

4. A rotation control apparatus as claimed in claim 1 which further comprises switching means coupled to said control means, said first signal generating means generating a driving signal from the signal detected by said signal detecting means, said switching means being controlled by said control means so that said switching means supplies the output driving signal of said first signal generating means to said motor in the reproducing mode and supplies the output driving signal of said control means to said motor in the recording mode.

5. A rotation control apparatus as claimed in claim 1 in which said comparator means comprises a phase comparator for comparing phases of said first and second signals, a lowpass filter for filtering an output phase error signal of said phase comparator, and a comparing circuit for comparing an output singal of said lowpass filter and a threshold value and for producing a signal having a first logical value when the output signal of said lowpass filter exceeds said threshold value and having a second logical value when the output signal of said lowpass filter is smaller than said threshold value.

6. A rotation control apparatus for controlling a rotation frequency of an information recording disc which is to be rotated at a constant linear velocity, said rotation control apparatus comprising:
a motor for rotating said information recording disc;
signal detecting means for detecting a pre-recorded signal on said information recording disc in a reproducing mode;
driving means for driving said signal detecting means;
position detecting means for detecting a scanning radial position of said signal detecting means on said information recording disc and for producing a radial position information;
first signal generating means for generating a first signal and a first driving signal from the signal detected by said signal detecting means, said first signal having a first frequency proportional to a rotation frequency of said information recording disc;
second signal generating means for generating in response to a predetermined signal a second signal having a second frequency which successively increases;
comparator means for comparing said first and second signals and for producing a signal indicating whether or not said first and second frequencies are equal to each other;
control means for producing and supplying the predetermined signal to said second signal generating means to control said second frequency, said control means being supplied with the output signal of said comparator means and the radial position information from said position detecting means for obtaining a rotation frequency information of said information recording disc from said predetermined signal at a time when said first and second frequencies become equal to each other and for obtaining a linear velocity information from said rotation frequency information and said radial position information, said control means obtaining a present rotation frequency from said linear velocity information and said radial position information and producing a second driving signal from said present rotation frequency; and
switching means supplied with said first and second driving signals, said switching means supplying said first driving signal to said motor in the reproducing mode and supplying said second driving signal to said motot in the recording mode, so that said informatin recording disc rotates at the constant linear velocity.

7. A rotation control apparatus as claimed in claim 6 in which said second signal generating means comprises a voltage controlled oscillator for generating said second signal responsive to said predetermined signal.

8. A rotation control apparatus as claimed in claim 7 in which an output oscillation frequency of said voltage controlled oscillator becomes higher as a value of said predetermined signal becomes larger.

9. A rotation control apparatus as claimed in claim 6 in which said comparator means comprises a phase comparator for comparing phases of said first and second signals, a lowpass filter for filtering an output phase error signal of said phase comparator, and a comparing circuit for comparing an output signal of said lowpass filter and a threshold value and for producing a signal having a first logical value when the output signal of said lowpass filter exceeds said threshold value and having a second logical value when the output signal of said lowpass filter is smaller than said threshold value.

10. A rotation control apparatus as claimed in claim 6 in which said control means supplies to said switching means a switching signal for controlling a switching state of said switching means.

11. A rotation control apparatus as claimed in claim 10 in which said control means is supplied with a command instructing a new recording from a specific address on said information recording disc where a previous recording was discontinued, said control means comprising means for detecting a present address from the signal detected by said detecting means and for controlling said driving means until said specific address is reached, said control means supplying such a switching signal to said switching means that said switching means supplies said first driving signal to said motor when said command is received until said specific address is reached and supplies said second driving signal to said motor after said specific address is reached.

12. A rotation control apparatus as claimed in claim 11 in which said control means supplies such a switching signal to said switching means that said switching means supplies said first driving signal to said motor after a recording operation is completed in the recording mode.

13. A rotation control apparatus as claimed in claim 6 in which said control means supplies said predetermined signal to said switching means as said second driving signal.

* * * * *